May 24, 1938. K. W. HALLDEN 2,118,402
MIS-CUT ROTARY SHEARS
Filed Jan. 10, 1936 2 Sheets-Sheet 2

INVENTOR,
Karl W. Hallden.
BY Louis M. Schmidt
ATTORNEY

Patented May 24, 1938

2,118,402

UNITED STATES PATENT OFFICE 2,118,402

MIS-CUT ROTARY SHEARS

Karl William Hallden, Thomaston, Conn.

Application January 10, 1936, Serial No. 58,496

3 Claims. (Cl. 164—68)

My invention relates to improvements in mis-cut rotary cutters such as are used for cutting material of various kinds, such as paper, brass, copper, and steel into equal lengths from stock fed to the cutter and the object of my improvement is to produce a mis-cut rotary cutter in which is incorporated in conjunction with means for varying the length of the cut throughout a definite range means for periodically preventing cutting cooperation of the cutting blades and without change in the rates of revolution of the rotary cutter structures and likewise comprising gear means for positively holding the mating cutter blades in their proper efficient relation during the work of cutting, involving as a detail, means for pulling the one cutter away from the other to effect a mis-cut and means for ensuring proper meshing of the gear means mentioned.

In the accompanying drawings:—

My improved mis-cut rotary cutter, as shown, is incorporated in a structure for feeding sheet material.

The feeding unit 10 may or may not include straightening rolls in addition to feed rolls and feeds the sheet material to the cutter unit 11, both units being driven by the common motor 12.

Figure 1:
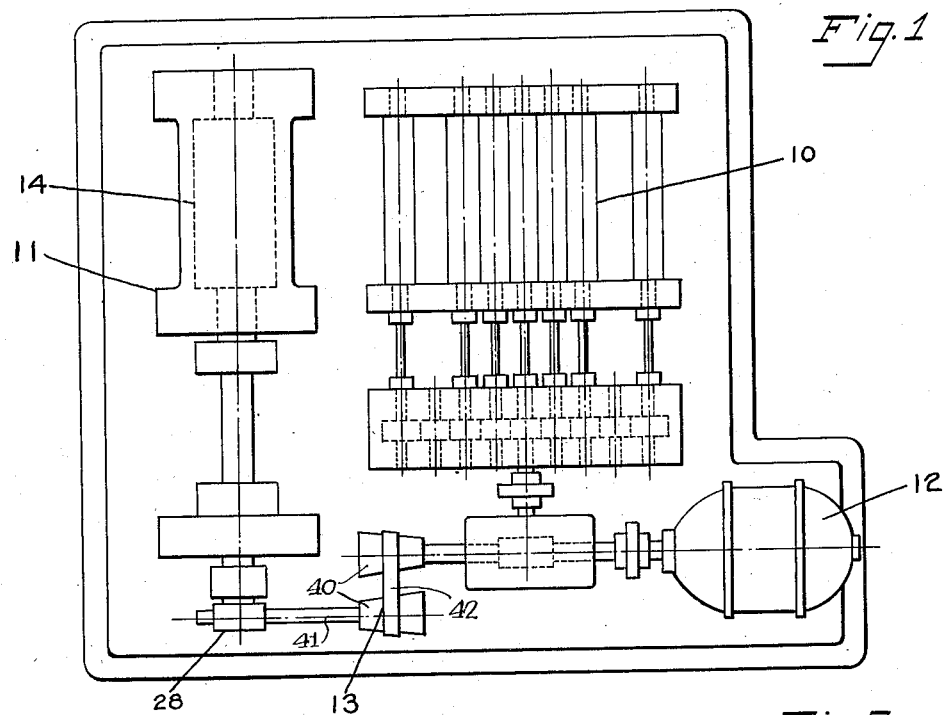
Figure 1 is a diagrammatic plan view of a mis-cut rotary cutter embodying my invention as applied to a machine that is adapted for cutting sheet material.
Figure 2:
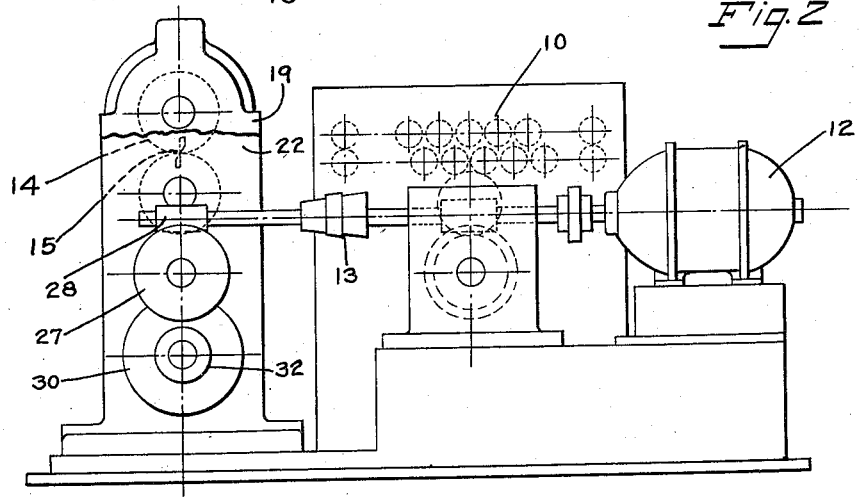
Fig. 2 is an elevational view of the same.
Figure 3:
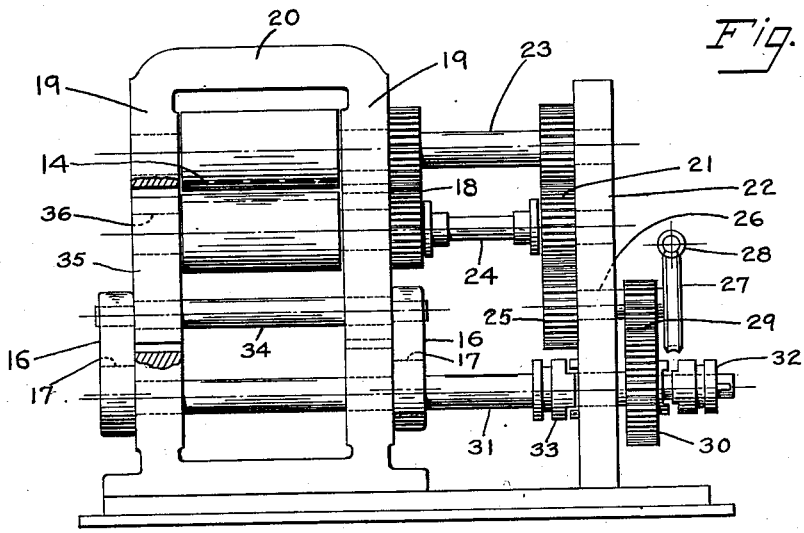
Fig. 3 is a face elevational view of the cutter unit.
Figure 4:
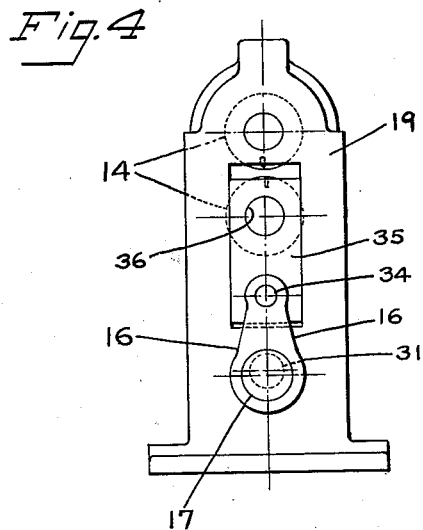
Fig. 4 is an end view of the cutter unit of the end remote from that shown in Fig. 2.
Figure 5:
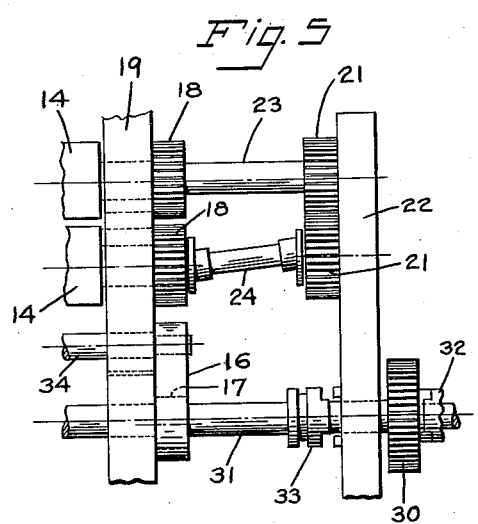
Fig. 5 is a view of parts that are shown in Fig. 3 in the mis-cut position.

A variable speed mechanism of any proper form, designated by the character 13, is provided, such as a Reeves variable speed mechanism, a P. I. V. mechanism made by the Link-Belt Company, or the like, and serves to permit of changes in the length of the cut throughout a definite range, the length being dependent upon the diameters of the rotating drums 14 that carry the cutting blades 15. A Reeves drive may be used for the variable speed mechanism as mentioned and as shown diagrammatically in Fig. 1, comprising a pair of cone pulleys 40, one on the motor shaft and the other on the driven shaft 41. A belt 42 connects the two pulleys.

Thus to effect a change to a short length or a longer length common practice is to change the drums. To provide the different sized drums adds to the cost and the operation of changing them involves time and expense.

By providing for mis-cut at regular intervals a change to the extent of a multiple of a base or initial length of material such extra costs are avoided and means for doing this are provided in the machine under consideration.

The means for doing this comprise the use of connecting-rods or links 16 that serve to operatively support the lower drum 14 at all times and that are supported by their lower ends by eccentrics 17 that serve to pull the said lower drum downwardly away from the upper drum to effect the mis-cut.

The structure comprises timing gears 18 that are incorporated respectively in the structures of the rotating drums and that by intermeshing during the actual work of cutting serve to positively maintain the proper relation of the blades for efficient cutting.

The timing gears 18 are located closely adjacent one of the spaced members 19 of the frame structure 20 that serves as the support for the drums 14 and closely associated elements. In spaced relation to the timing gears 18 are the power gears 21 that are closely adjacent an auxiliary frame member 22.

A shaft or coupling structure 23 of ordinary form connects the timing gear 18 and the power gear 21 for the upper drum 14.

In the case of the corresponding lower gears 18 and 21 the coupling structure 24 has characteristics of a flexible structure such as to permit of bodily pulling the lower drum 14 with the lower cutting blade 15 and the lower timing gear 18 downwardly and away from the mating corresponding upper parts. And this is done without affecting the relative relation of these parts as to the detail of rotation in that the power gears 21 that serve to effect the respective drives are maintained at all times in their proper cooperative relation.

Thus means are provided for permitting the power gears to drive the cutting blades always at the same peripheral speed, whether in the cutting position or not, and the timing gears are always rotated uniformly at the same rate whether maintained in the cooperative relation or pulled apart. Wherefore, when the lower timing gear is reelevated from the lower to the upper position a proper inter-relation of the teeth thereof is ensured. Also, chattering under spaced conditions of the gears is avoided.

The power gears 21 are driven through the medium of the lower thereof that is in mesh with the gear 25 on shaft 26, which is driven by worm gear 27 that meshes with the worm 28 on the shaft 41.

The means for effecting the skip-cut are driven by the gear 29 on said shaft 26 which meshes with the gear 30 on the auxiliary shaft 31 and which gear 30 is free to rotate on shaft 31. A clutch 32 on the adjacent free end of the shaft 31 serves as the means for completing the drive connection. A second clutch 33 on shaft 31 serves as a means for locking the shaft against rotation when not driven. The clutches or couplings 32 and 33 are of ordinary form and each comprises a member that is splined respectively, the one on shaft 31 and near the end thereof, and the other on the same shaft and on the inner side of the auxiliary frame member 22.

The shaft 31 continues through the frame structure so as to support by parts thereof just outside the frame members 19 the cams or eccentrics 17 which are rotatable with shaft 31.

The links 16 extend upwardly from the cams 17 and by their upper ends operatively support a shaft 34 that extends through and is operatively engaged with the lower portion of each of two sliding boxes 35 that operate in the side frame elements 19.

The upper portions of the boxes 35 carry the bearings 36 for the lower blade-supporting roll or drum 14.

The gears 29 and 30 shown provide for a two-to-one relation. Other gears giving a different ratio can be substituted or a gear box with a choice of ratios can be provided.

Thus the change from ordinary operation in which the blades come together so as to be adapted to effect a cutting of the stock during each revolution of the cutter drums to the mis-cut condition is made by a relatively simple manipulation of the clutches. Also, means are provided for facilitating a change for different multiple lengths of the base cut of the single revolution.

Also, provision is made against chattering of the timing gears and consequent liability to damage.

I claim as my invention:—

1. In a mis-cut rotary cutter, a lower rotary cutter and drive means for effecting the rotation thereof, a cam shaft, cams on said shaft and links driven by said cams serving as the means for operatively supporting said cutter, and gear devices and clutch-control means serving to operatively connect said shaft with the drive means, a second clutch structure for locking said shaft against rotation when the first mentioned clutch-control means is disconnected.

2. In a mis-cut rotary cutter, a frame, an upper rotary cutter supported therein, drive means, means connecting said drive means and cutter for effecting continuous rotation thereof, a lower cutter and means connecting the same with said drive means operating likewise to effect continuous rotation thereof, blocks slidably supported in said frame serving as the means for supporting the bearings for said lower cutter, an auxiliary shaft supported by said frame and provided with means for operative connection with said drive means, cams on said shaft and positively connected to said blocks for effecting movement thereof responsive to rotation of said auxiliary shaft, whereby means are provided for positively shifting the relation of the two cutters for effecting cut and mis-cut, clutch means for checking rotation of the auxiliary shaft for use in holding the same during the setting for cutting.

3. In a mis-cut rotary cutter as described in claim 2, connecting-rods serving as means for positively connecting the cams and blocks.

KARL WILLIAM HALLDEN.